United States Patent [19]

Kenney

[11] Patent Number: 4,488,789

[45] Date of Patent: Dec. 18, 1984

[54] ELECTROMAGNETICALLY DEFLECTABLE DEVICE

[75] Inventor: George C. Kenney, Ossining, N.Y.

[73] Assignee: North American Philips Corporation, New York, N.Y.

[21] Appl. No.: 332,897

[22] Filed: Dec. 21, 1981

[51] Int. Cl.³ .............................................. G02B 27/17
[52] U.S. Cl. .................................... 350/486; 248/466; 369/44
[58] Field of Search .......................... 350/486; 369/44; 248/466, 562, 563

[56] References Cited

U.S. PATENT DOCUMENTS 4,011,003  3/1977  Dragt .................................. 350/486

Primary Examiner—John K. Corbin
Assistant Examiner—Rebecca D. Gass
Attorney, Agent, or Firm—Joseph P. Abate

[57] ABSTRACT

An electromagnetically deflectable device includes a mirror pivotally mounted to a support by means of a silicone based resilient element. An electromagnetic deflection coil is fixed to the mirror underside. The coil lead wires are embedded in the resilient element and pass through the element to the support.

18 Claims, 6 Drawing Figures

ELECTROMAGNETICALLY DEFLECTABLE DEVICE

BACKGROUND OF THE INVENTION

The present invention relates to pivotally mounted members and specifically concerns a device for controllably positioning a reflective member utilizing electromagnetic forces. Such devices are particularly useful in optical image reproducing systems which read a video disc and develop an electrical signal representative of stored program information.

Systems for the retrieval and reproduction of information stored on rotating video discs are now fairly well known, for example, from U.S. Pat. No. 3,854,015. A video disc has information stored as concavities or pits in a spiral shaped track. The length of the concavities and the spacing between them determine the information on the video disc. An optical reading beam, for example, laser generated, impinges on the concavities and follows the track to read the information. The concavities affect the light of the reading beam so that the light reflected from the disc is modulated in accordance with the stored information.

Because there is no mechanical coupling between the disc and the reading beam, radial tracking misregistration can occur. That is, the optical beam may drift between tracks and information will not be desirably reproduced. Accordingly, arrangements are known which develop an error or tracking correction signal having a polarity which indicates the sense of radial misregistration and an amplitude proportional to the extent of misregistration, as described in U.S. Pat. No. 3,854,015.

A variety of devices have been employed to respond to the correction signal and adjust an optical member, such as a mirror or a prism in the optical path of the read beam, to maintain tracking registration. Additionally, adjustment of such optical members is utilized for deflecting the optical beam to correct timing errors introduced by fluctuations in the rotational speed and by mechanical distortions in the disc. The read beam is corrected through a tangential path normal to the beam path required for radial correction.

Prior art deflectable devices relevant to the present invention are of two types. The first type employs permanent magnets fixed to a mirror pivotally mounted on a frame and surrounded by a coil fixed to the frame. The error correction signal is applied to the coil leads and the mirror is electromagnetically deflected from its rest position in proportion to the applied signal in a manner well-known in the art. This type of arrangement, however, is subject to stray magnetic fields which can cause undesired movement of the mirror.

A second type of deflectable member device includes magnets or pole pieces fixed to a frame and a coil fixed to the underside perimeter of the mirror. The mirror is pivotally mounted to the frame by means of a support having a first end fixed to the frame and a second end cooperating with the underside surface of the mirror. An elastic or resilient element extends between the mirror underside surface and the support second end and provides adhesion of the mirror to the support and permits the pivotal motion of the mirror. The coil and the mirror are then arranged in the magnetic field produced by the pole pieces. The mirror is pivotal about the support in a direction and magnitude controlled, respectively, by the polarity and magnitude of the error correction signal applied to the coil. Further, the resilient element provides forces which restore the mirror to its rest position when the error signal has zero amplitude.

This second type of device eliminates the stray magnetic field problems but results in mechanical resonances produced by the coil lead wires of the moving coil. Attempts have been made to reduce such lead resonances, through, for example, alignment of the coil leads spaced from and parallel to the mirror's pivotal axis. Applicant believes such a prior art device is presently contained, for example, in the model No. VP1000 Video Disc Player manufactured by the Pioneer Corporation. These attempts, however, have not proven entirely satisfactory. The alignment approach is fragile and difficult to maintain. If the lead wires are slightly off center, they tend to bend as the element pivots and eventually break.

SUMMARY OF THE INVENTION

The present invention is an improved pivotal member device useful for the second type of mirror mount previously discussed, namely, a mount having a moving coil element and fixed magnets; and, more broadly, for any pivotal member to which electrical connections must be made.

It is an object of the present invention, therefore, to provide an improved pivotally mounted device having a pivotal member which device eliminates the lead-wire resonance problems of the prior art and provides a more robust mechanical device.

In accordance with the invention, the coil lead wires are routed to the resilient element and embedded therein.

The invention includes a resilient element which comprises a mass of an elastomeric material, preferably silicone based, which pivotally adheres the member to the support. Further, the coil lead wires are routed to the resilient element and are embedded therein and extend from the member to the support through the element. The resilient element and the support preferably are the sole mounting of the member to the frame. Additionally, the lead wires may comprise a twisted wire pair embedded in the resilient element.

Such an improved device eliminates the lead resonance problems because the leads are not free to vibrate. Further, the device is more mechanically robust than the heretofore known electromagnetically deflectable devices having pivotally mounted members. The device is particularly useful in video disc systems which require rapid optical beam adjustment.

Further and still other objects of the present invention will be more readily apparent from the following description when taken in conjunction with the following drawings.

DETAILED DESCRIPTION OF THE PREFERRED EMBODIMENTS

Figure 1:
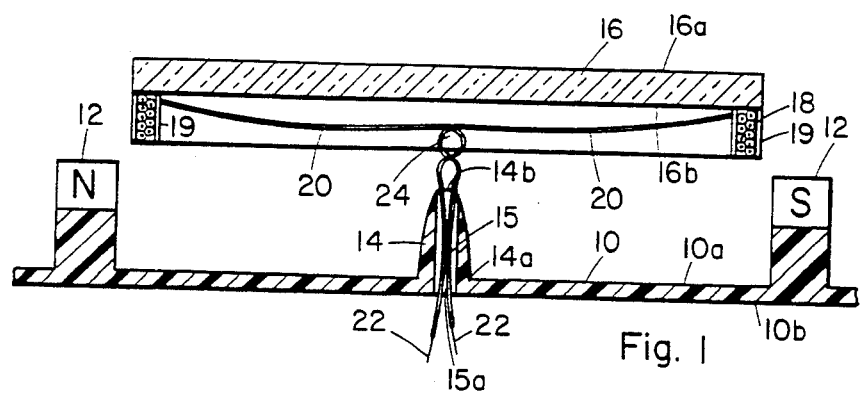
FIG. 1 is a sectional view of a preferred device according to the invention prior to assembly.

Referring now to the figures and FIG. 1 in particular, there is shown a preferred embodiment of the present invention prior to assembly. A frame 10 having a top side 10a and a bottom side 10b is coupled to a support 14. Support 14 has a bore or passage 15 extending longitudinally therethrough aligned with an opening 15a in the bottom side 10b of the frame 10. The frame 10 and the support 14 may be integrally constructed from a suitable plastic. Alternatively, the support may be attached to the frame by an adhesive.

Support 14 has a first attachment end 14a attached to the frame 10 and a second attachment end 14b. The second attachment end 14b, for example, may be a circular-symmetrical mount and have a recessed region or depression 28 (FIG. 3) located at the ends of a diameter of the mount. The support 14 may be cylindrical, bullet-shaped or have any appropriate shape for providing support for the member 16.

The second attachment end 14b including the region 28 has an amount of an elastomeric cement or adhesive placed thereon which, when cured, forms the resilient element 26 which adheres to and pivotally mounts the member 16 to the support 14. The elastic adhesive which forms the resilient element 26 will be discussed later and, for example, may be a silicone based cement such as a "Silastic" compound.

Member 16 to be pivoted has a front surface 16a and a back surface 16b and, for example, can be a mirror, prism or other element which is to be electromagnetically displaced to deflect an optical beam. For video disc applications, the mirror 16 is preferably a front surface mirror.

A coil element (electromagnetic deflection coil) 18 comprises a substantially rectangular wound coil which is fixed to the back surface 16b along the perimeter of the mirror 16 by a suitable adhesive. The coil 18 may be attached to appropriate mounting brackets 19 which are fixed to the mirror back surface 16b. The coil 18 may be arranged substantially planar. Two insulated electrical conductors or lead wires 20 having lead wire ends 22 extend from the coil 18 along a transverse axis of the mirror back surface 16b preferably to the center of gravity of mirror 16 located on surface 16b. The lead wires 20 conduct a control current to and from the coil 18. The lead wires 20 may be twisted, for example, at least 180°, the twist being located at the center of surface 16b to form a twisted wire pair 24. Twisting wire pair 24 at the center causes the lead wires 20 to lie close to the surface 16b.

Appropriately fixed to the frame 10 are pole pieces or magnets 12 which create a magnetic field across the frame top side 10b. The magnets 12 are arranged to produce a magnetic field across at least a portion of the coils 18 when the mirror 16 is mounted on the support 14. The coil 18 and, therefore, the mirror 16 tend to rotate under the influence of a net torque produced by the current carrying coil arranged in the magnetic field. Of course, permanent magnets 12 may be electromagnetic means for producing the magnetic field across the surface 10a.

Figure 2:
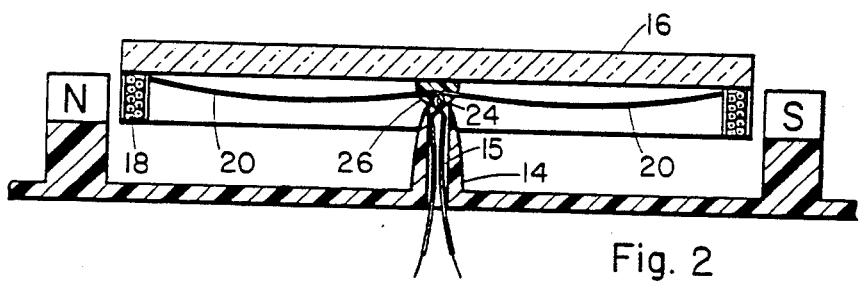
FIG. 2 is a similar view of the device of FIG. 1 after assembly.
Figure 3:
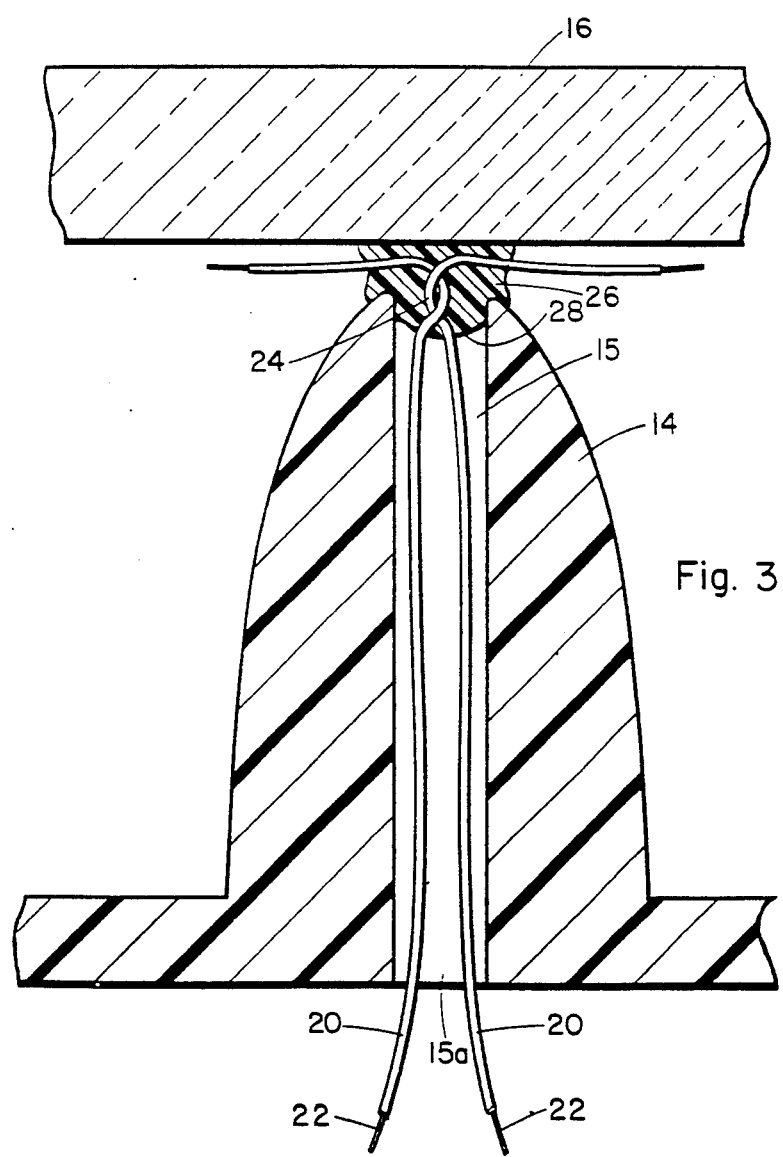
FIG. 3 is an enlarged sectional view of the support of FIG. 2.

A small amount of an uncured elastomeric adhesive material, for example, half the size of a pea, is applied to the centrally located twisted pair 24 and, therefore, to the backside 16b of mirror 16. The adhesive material may be a synthetic elastomer such as the silicone based adhesive "RTV" rubber. The material must be one which, after curing, is capable of recovering size and shape after deformation. The lead wires are then passed through passage 15 and emerge from the opening 15a. FIGS. 1, 2 and 3 show the lead wires 20 passing centrally through support 14 and wire ends 22 emerging from the openings 15a. Of course, it is not required that conductors 20 pass centrally through support 14. One or both of the lead wires 20 and, therefore, wire ends 22 may emerge at selected points along the support 14. It is only required that a segment of each of the conductors 20 be embedded within the resilient element 26 and it might, in fact, emerge along the diametric recess adjoining the support 14. Alternatively, an additional amount of adhesive sufficient to embed lead wires 20 within the bore 15 may fill the bore 15. The mirror backside 16b then is appropriately arranged on the support 15 while the adhesive cures, for example, by using a jig.

Figure 5:
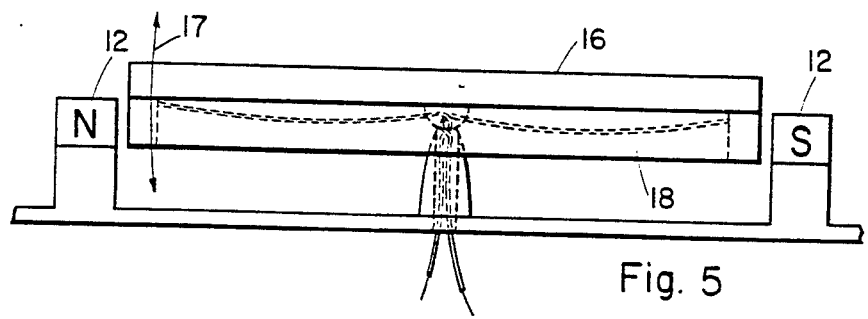
FIG. 5 is an elevational view of the present invention displaying its pivotal direction.

The mirror 16, therefore, is pivotal in a direction indicated by the arrow 17 in FIG. 5.

FIG. 2 shows mirror 16 mounted on the support 14 through the resilient element 26 after the elastomeric material has cured. Element 26 has a twisted wire pair 24 embedded therein and provides a torque counter to the torque produced by the current carrying coil 18 reacting with the magnetic field produced by the pole pieces 12. Substantially no net magnetic force is experienced by the twisted wire pair 24 because the current flowing in the two lead wires 20 is in opposite directions. Various other arrangments of the coil 18 and magnets 12 may also be used to generate pivoting torques, and need not be discussed further.

Figure 4:
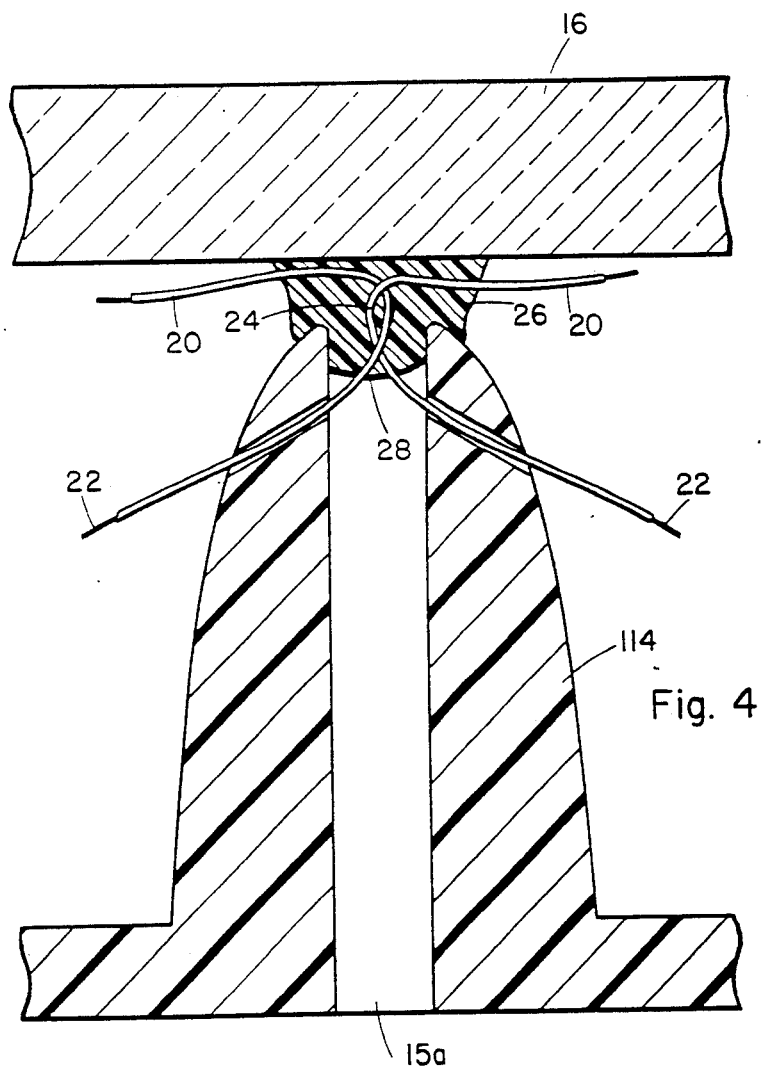
FIG. 4 is also an enlarged sectional view of another support embodying the invention, having each lead wire passing through a portion of the support.

Referring again to FIG. 3 there is shown a detailed view of support 14 and the recessed region 28, with the resilient element 26 having a twisted wire pair 24 embedded therein. FIG. 4 shows a support 114 identical to that shown in FIG. 3 except lead wires 20 are shown passing through portions of the support 114 adjoining the resilient element 26.

Figure 6:
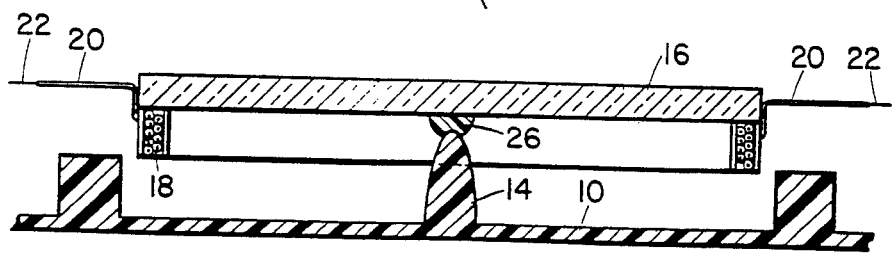
FIG. 6 is a sectional view of a prior art device having the coil lead wires mounted parallel to the mirror's pivotal axis.

FIG. 6 shows a prior art arrangement which is pivotal on support 14 into the plane of the paper. Conductors 20 and conductor ends 22 are shown parallel to and spaced from the pivotal axis of the mirror. Such arrangements, however, exhibit the aforementioned lead or mechanical reasonance problems.

The present invention provides a simple, lightweight and mechanically robust device which allows fast corrective changes of the path of an optical read beam in a video disc system. Further, by embedding the lead wires in a silicone based mounting element, mechanical or lead resonances are eliminated. It will also be apparent to those skilled in the art that other modifications may be made without departing from the broad principle and spirit of this invention which shall be limited only by the scope of the appended claims.

I claim:

1. A device including a pivotally mounted member having electrical connections comprising:
    a frame;
    a member;
    a support for mounting said member to said frame, said support having a first attachment end attached to said frame, and a second attachment end;

a resilient element extending between said member and said support, for pivotally mounting said member to said support; and at least one lead wire extending from said member;

characterized in that said resilient element is a mass of resilient material and said at least one lead wire is embedded in said mass of material and extends from said member to said support through said element.

2. A device as claimed in claim 1, characterized in that said resilient element and support are the sole mounting of said member to said frame and the device comprises at least two said lead wires twisted together and embedded in said resilient element.

3. A device as claimed in claim 2, characterized in that said lead wires pass through at least a portion of said support adjoining said resilient element.

4. An electromagnetically deflectable device comprising:

a member which is to be electromagnetically deflected;

a support;

an electromagnetic deflection coil fixed to said member;

two electrical conductors extending from said coil to said support; and a resilient element for mounting said member to said support so as to permit pivotal movement of said member;

characterized in that said resilient element comprises a mass of resilient material and said electrical conductors are a twisted wire pair embedded in and extending through said resilient element.

5. A device as claimed in claim 4, characterized in that said twisted wire pair passes through at least a portion of said support adjoining said resilient element.

6. A device as claimed in claim 4, characterized in that said support has a recessed region and said resilient element is adhered to said support in said recessed region.

7. A device as claimed in claim 4 or 6, characterized in that said resilient element is a mass of a synthetic elastomer.

8. A device as claimed in claim 4 or 6, characterized in that said resilient element is a silicone based material.

9. A device for controllably deflecting an optical beam comprising:

a frame;

an optical-beam deflecting member;

a support for mounting said member to said frame, said support having a first attachment end attached to said frame, and a second attachment end;

a resilient element extending between said member and said support, for pivotally mounting said member to said support, said element being attached to said second attachment end;

a coil fixed to said member and defining a plane and including two electric conductors extending from said coil to said support; and means mounted on said frame for producing a magnetic field substantially parallel to said plane through said coil;

characterized in that said electric conductors are insulated conductors embedded in and passing through said resilient element to said support.

10. A device as claimed in claim 9, characterized in that said member is a mirror.

11. A device as claimed in claim 9, characterized in that said member is a front surface mirror.

12. A device as claimed in claim 9, characterized in that said member is symmetrical and has a surface facing the support, said surface having a center, said resilient element being adhered to the center of said surface and said condutors passing centrally through said resilient element at substantially the center of gravity of the member and coil.

13. A device as claimed in claims 9 or 12, characterized in that said support has a recessed region and said resilient element is adhered to said support in said recess region.

14. A device as claimed in claim 9, characterized in that said resilient element comprises a mass of a synthetic elastomer.

15. A device as claimed in claim 13, characterized in that said wires pass from said element into said support at the center of said recess.

16. A device as claimed in claim 13, characterized in that said resilient element is an elastomeric cement which cures to adhere to said member and to said support.

17. A device as claimed in claim 9, characterized in that said conductors are a twisted wire pair.

18. A device as claimed in claim 17, characterized in that said twisted wire pair passes through a portion of the support in which the recess region is formed and passes through said recess region to said element.

* * * * *